(12) United States Patent
Tsuchiya et al.

(10) Patent No.: US 9,363,550 B2
(45) Date of Patent: Jun. 7, 2016

(54) INFORMATION PROCESSING APPARATUS, TELEVISION RECEIVER, INFORMATION PROCESSING METHOD, PROGRAM, AND INFORMATION PROCESSING SYSTEM

(75) Inventors: Kazuhisa Tsuchiya, Nagano (JP); Yasuo Nomura, Nagano (JP)

(73) Assignee: SONY CORPORATION, Tokyo (JP)

(*) Notice: Subject to any disclaimer, the term of this patent is extended or adjusted under 35 U.S.C. 154(b) by 28 days.

(21) Appl. No.: 13/349,465

(22) Filed: Jan. 12, 2012

(65) Prior Publication Data

US 2012/0192245 A1 Jul. 26, 2012

(30) Foreign Application Priority Data

Jan. 21, 2011 (JP) ................................. 2011-011414

(51) Int. Cl.

| H04N 7/16 | (2011.01) |
|---|---|
| H04N 21/422 | (2011.01) |
| H04N 21/442 | (2011.01) |
| H04N 21/485 | (2011.01) |
| H04N 21/41 | (2011.01) |
| H04N 21/436 | (2011.01) |

(52) U.S. Cl.
CPC ..... *H04N 21/4222* (2013.01); *H04N 21/44227* (2013.01); *H04N 21/485* (2013.01); *H04N 21/4113* (2013.01); *H04N 21/43615* (2013.01)

(58) Field of Classification Search
CPC combination set(s) only.
See application file for complete search history.

(56) References Cited

U.S. PATENT DOCUMENTS

| 6,870,570 | B1* | 3/2005 | Bowser .................... 348/552 |
| 7,360,232 | B2* | 4/2008 | Mitchell ................... 725/112 |
| 8,488,942 | B2* | 7/2013 | Smith et al. .............. 386/241 |
| 2001/0044759 | A1* | 11/2001 | Kutsumi et al. ............ 705/27 |
| 2002/0016820 | A1* | 2/2002 | Du Val et al. ............. 709/203 |
| 2002/0151327 | A1 | 10/2002 | Levitt |
| 2002/0174442 | A1 | 11/2002 | Nomura |
| 2003/0093791 | A1 | 5/2003 | Julia et al. |
| 2003/0229898 | A1* | 12/2003 | Babu et al. ................. 725/87 |
| 2007/0250901 | A1* | 10/2007 | McIntire et al. ........... 725/146 |
| 2008/0077965 | A1 | 3/2008 | Kamimaki et al. |
| 2008/0109866 | A1 | 5/2008 | Thomas et al. |
| 2008/0168499 | A1* | 7/2008 | Kuroiwa et al. ............ 725/45 |
| 2009/0044227 | A1* | 2/2009 | Nagatani et al. ........... 725/46 |
| 2009/0158350 | A1* | 6/2009 | DeCamp .................... 725/58 |
| 2009/0300679 | A1 | 12/2009 | Hiroi et al. |

(Continued)

FOREIGN PATENT DOCUMENTS

| CN | 101247494 A | 8/2008 |
| CN | 101682733 | 3/2010 |

(Continued)

OTHER PUBLICATIONS

Office Action issued in corresponding Japanese application No. 2011-011414 dated Jun. 2, 2015 and the English Translation.

(Continued)

*Primary Examiner* — Chenea Smith
(74) *Attorney, Agent, or Firm* — Frommer Lawrence & Haug LLP; William S. Frommer; Ellen Marcie Emas

(57) ABSTRACT

There is provided an information processing apparatus including an operation section which performs remote control of a television receiver, and a content information acquisition section which acquires content information related to content provided by the television receiver, and causes a storage section to store the content information.

28 Claims, 14 Drawing Sheets

(56) References Cited

U.S. PATENT DOCUMENTS

2010/0205628 A1    8/2010  Davis et al.
2010/0235868 A1*   9/2010  Howarter et al. ............... 725/82
2010/0333124 A1*  12/2010  Folgner et al. ................. 725/13
2011/0138416 A1*   6/2011  Kang et al. ..................... 725/39

FOREIGN PATENT DOCUMENTS

| EP | 2 157 786 | 2/2010 |
|----|-----------|--------|
| JP | 2003-125305 | 4/2003 |
| JP | 2004-320146 | 11/2004 |
| JP | 2008-028915 | 2/2008 |
| JP | 2009-194659 | 8/2009 |
| JP | 2010-081262 | 4/2010 |
| JP | 2010-104062 | 5/2010 |
| JP | 2010-250510 | 11/2010 |
| WO | WO 03/015414 | 2/2003 |
| WO | WO 2005/013617 | 2/2005 |
| WO | WO 2006/085565 | 8/2006 |

OTHER PUBLICATIONS

"Nico Nico Pedia" that can be Created and Edited by User was Officially Opened, May 26, 2008, URL, http://internetwatch.impress.co.jp/cda/news/2008/05/26/19683.html (document showing the well-known art; cited document).

Office Action issued in corresponding Japanese Application No. 2011-011414 dated Nov. 10, 2015 and its English Translation.

Office Action issued in corresponding Chinese Application No. 201210013413.4 dated Sep. 25, 2015 and its English Translation.

* cited by examiner

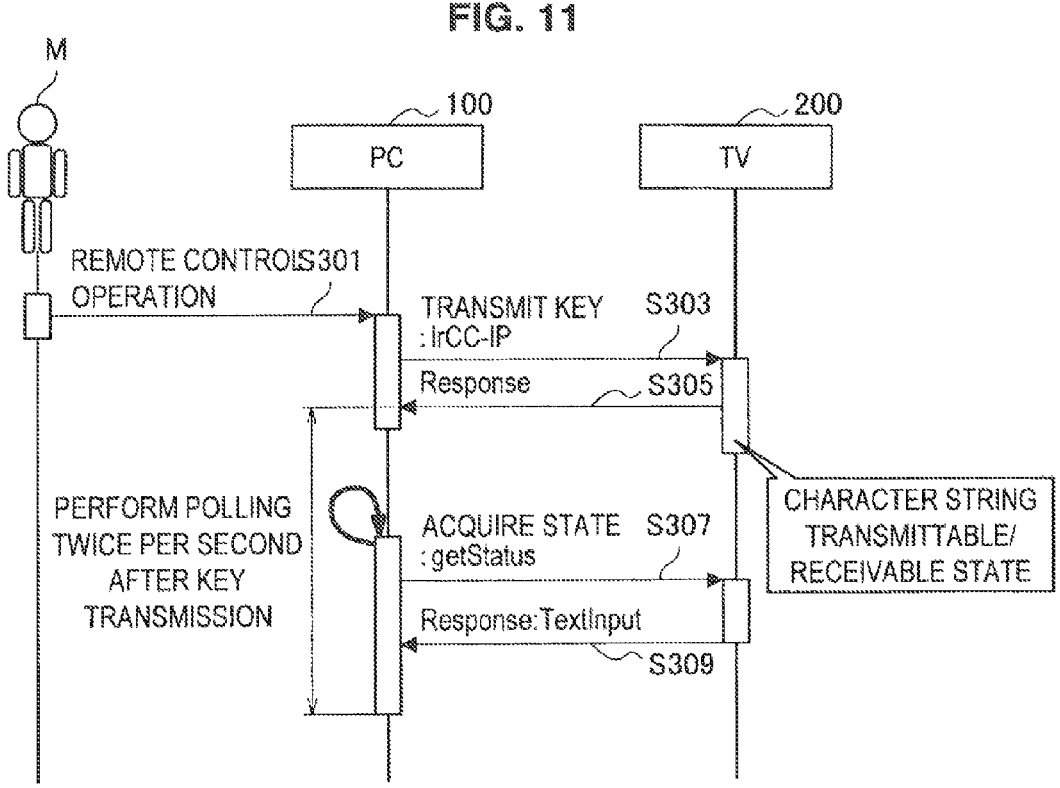
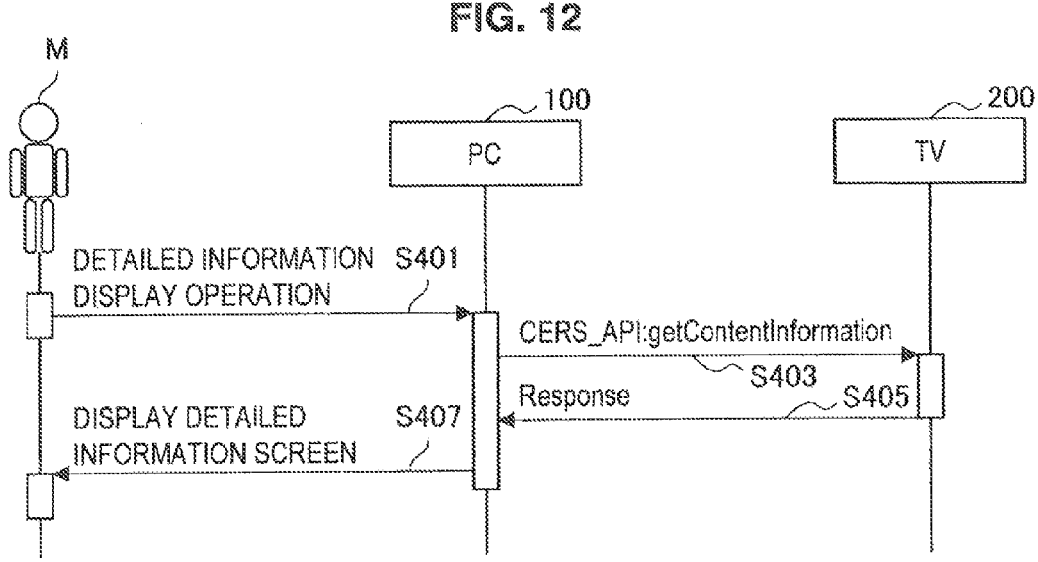

INFORMATION PROCESSING APPARATUS, TELEVISION RECEIVER, INFORMATION PROCESSING METHOD, PROGRAM, AND INFORMATION PROCESSING SYSTEM

BACKGROUND

The present disclosure relates to an information processing apparatus, a television receiver, an information processing method, a program, and an information processing system.

In recent years, there has been provided an apparatus having a remote control function to operate a television receiver from outside. For example, JP 2004-320146A discloses a remote control system for changing the state of a television receiver by operating a mobile phone.

SUMMARY

However, further improvements have been desired in the function of an apparatus which operates a device such as a television receiver from outside. In light of the foregoing, it is desirable to provide an information processing apparatus, a television receiver, an information processing method, a program, and an information processing system, which are novel and improved, and which are capable of improving functions of an apparatus having a remote control function for a television receiver.

According to an embodiment of the present disclosure, there is provided an information processing apparatus which includes an operation section which performs remote control of a television receiver, and a content information acquisition section which acquires content information related to content provided by the television receiver, and causes a storage section to store the content information.

According to such a configuration, the content information related to the content provided by the television receiver can be used in another information processing apparatus. Here, the other information processing apparatus has a remote control function to perform remote control of the television receiver. Further, the content provided by the television receiver may be a broadcast program which the television receiver receives, for example. Alternatively, the content may also be an application executed by the television receiver. Further, the content to be provided means that the content can be provided, and it does not necessarily mean that the content is being provided at that time point.

The information processing apparatus may further include a display control section which controls display of a display screen including the content information acquired by the content information acquisition section.

The information processing apparatus may further include a search section which searches for related information using as a keyword the content information acquired by the content information acquisition section. The display control section may control display of the display screen including the related information in addition to the content information.

The search section may search for the related information from among information stored in an external apparatus which is connected through a network.

The operation section may perform remote control of the television receiver based on the related information included in the display screen.

Even after the television receiver comes into a state of not providing content, the display control section may update the display screen including the related information based on the content information acquired by the content information acquisition section.

The operation section may change a channel received by the television receiver to a channel for providing content indicated by the related information.

The content information acquisition section may acquire content information related to content being provided by the television receiver. When the content provided by the television receiver is changed, the display control section may update contents of the display screen.

According to another embodiment of the present disclosure, there is provided a television receiver which includes a content acquisition section which acquires content to be provided, a display control section which controls display of the content, and a content information acquisition section which acquires content information related to the content, and transmits the acquired content information to an information processing apparatus that operates operation of the television receiver.

According to another embodiment of the present disclosure, there is provided an information processing apparatus which includes an operation section which performs remote control of a content reproduction apparatus, and a content information acquisition section which acquires content information related to content reproduced by the content reproduction apparatus, and causes a storage section to store the content information.

According to another embodiment of the present disclosure, there is provided an information processing method performed by an information processing apparatus including an operation section which performs remote control of a television receiver, the information processing method including acquiring content information related to content provided by the television receiver, and causing a storage section to store the content information.

According to another embodiment of the present disclosure, there is provided a program for causing a computer to function as an information processing apparatus including an operation section which performs remote control of a television receiver, and a content information acquisition section which acquires content information related to content provided by the television receiver, and causes a storage section to store the content information.

According to another embodiment of the present disclosure, there is provided an information processing system which includes a television receiver including a content acquisition section which acquires content to be provided, a display control section which controls display of the content, and a content information acquisition section which acquires content information related to the content, and transmits the acquired content information to an information processing apparatus that operates operation of the television receiver, and the information processing apparatus including an operation section which performs remote control of the television receiver, and a content information acquisition section which acquires content information related to content provided by the television receiver, and causes a storage section to store the content information.

According to the embodiments of the present disclosure described above, functions of the apparatus having the remote control function for the television receiver can be improved.

BRIEF DESCRIPTION OF THE DRAWINGS

FIG. 11 is a sequence diagram showing processing of acquiring a state of the information processing system according to the embodiment;

FIG. 12 is a sequence diagram showing detailed information screen-display processing performed in the information processing system according to the embodiment;

DETAILED DESCRIPTION OF THE EMBODIMENT(S)

Figure 1:
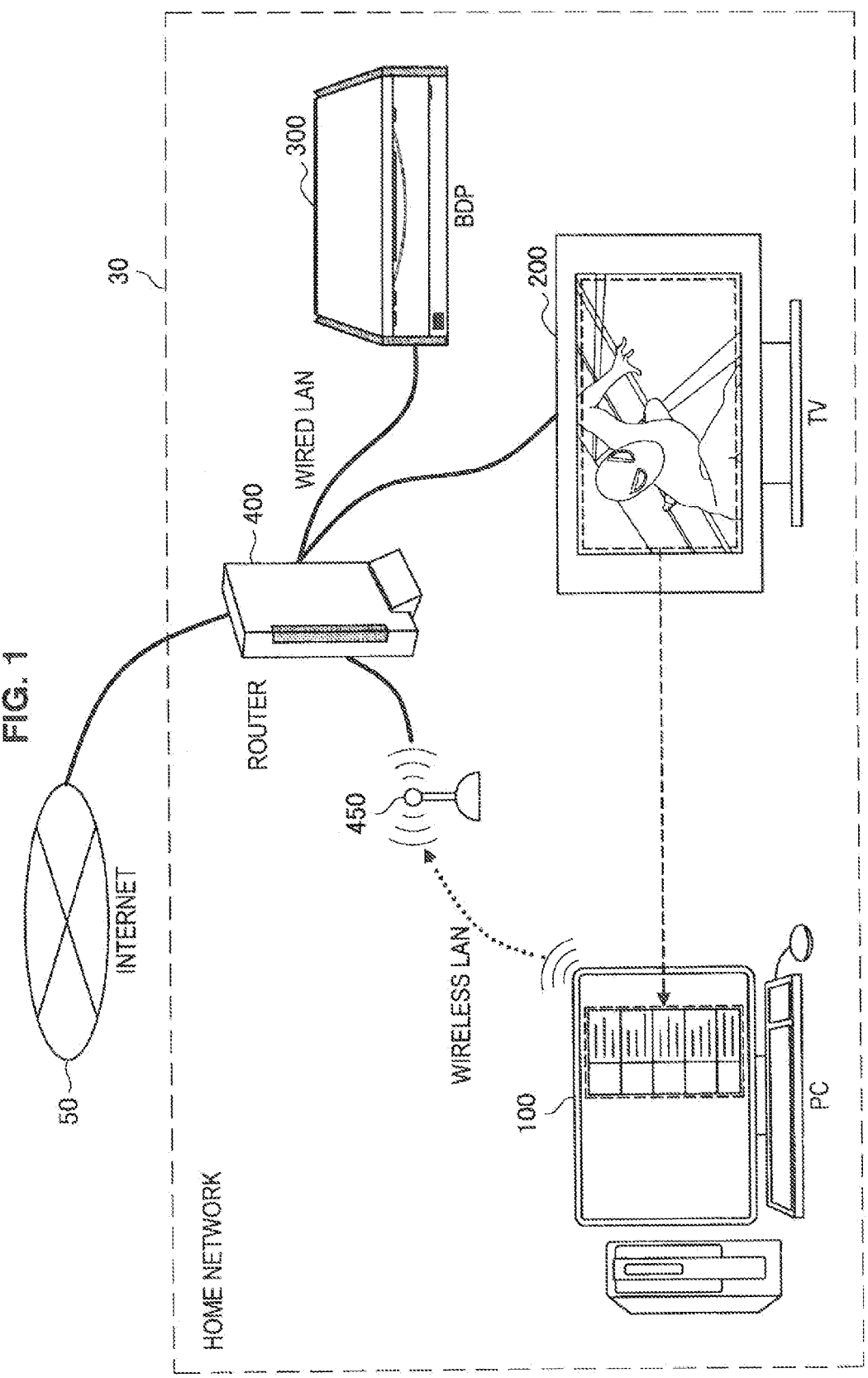
FIG. 1 is a configuration diagram of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Outline
2. Functional configuration of information processing apparatus
3. Hardware configuration of information processing apparatus
4. Functional configuration of television receiver
5. Outline of UNR protocol
6. Operation examples
6-1. Device connection operation
6-2. Remote control operation
6-3. Display operation of detailed screen
7. Examples of effects 1. Outline First, with reference to FIG. 1, an outline of an information processing system according to an embodiment of the present disclosure will be described. FIG. 1 is a configuration diagram of an information processing system according to an embodiment of the present disclosure.

An information processing system 1 according to the present embodiment has a plurality of devices each connected to a home network 30. As examples of the devices connected to the home network 30, there are shown in FIG. 1 a PC 100, a TV 200, and a BDP 300.

The PC 100 can operate the TV 200 and the BDP 300 by using a predetermined application. In this case, the PC 100 transmits operation information to the TV 200 and the BDP 300 through the home network 30, thereby operating the TV 200 and the BDP 300. Note that the PC 100, the TV 200, and the BDP 300 can be connected with each other through a router 400. The router 400 is a communication device for configuring the home network 30, and has a function of connecting the home network 30 to the Internet 50. Further, the router 400 can also be connected to a wireless access point 450. The wireless access point 450 can be connected wirelessly to the PC 100, for example. Then, the PC 100 connected to the wireless access point 450 can connect to the Internet 50, the TV 200, and the BDP 300, through the wireless access point 450 and the router 400.

In the present embodiment, there are shown a reproduction apparatus which reproduces content, and a remote control apparatus which is an information processing apparatus performing remote control of the reproduction apparatus through the home network 30. Hereinafter, a description will be made of the case where the reproduction apparatus is represented by the TV 200, and the remote control apparatus is represented by the PC 100.

2. Functional Configuration of Information Processing Apparatus

Figure 2:
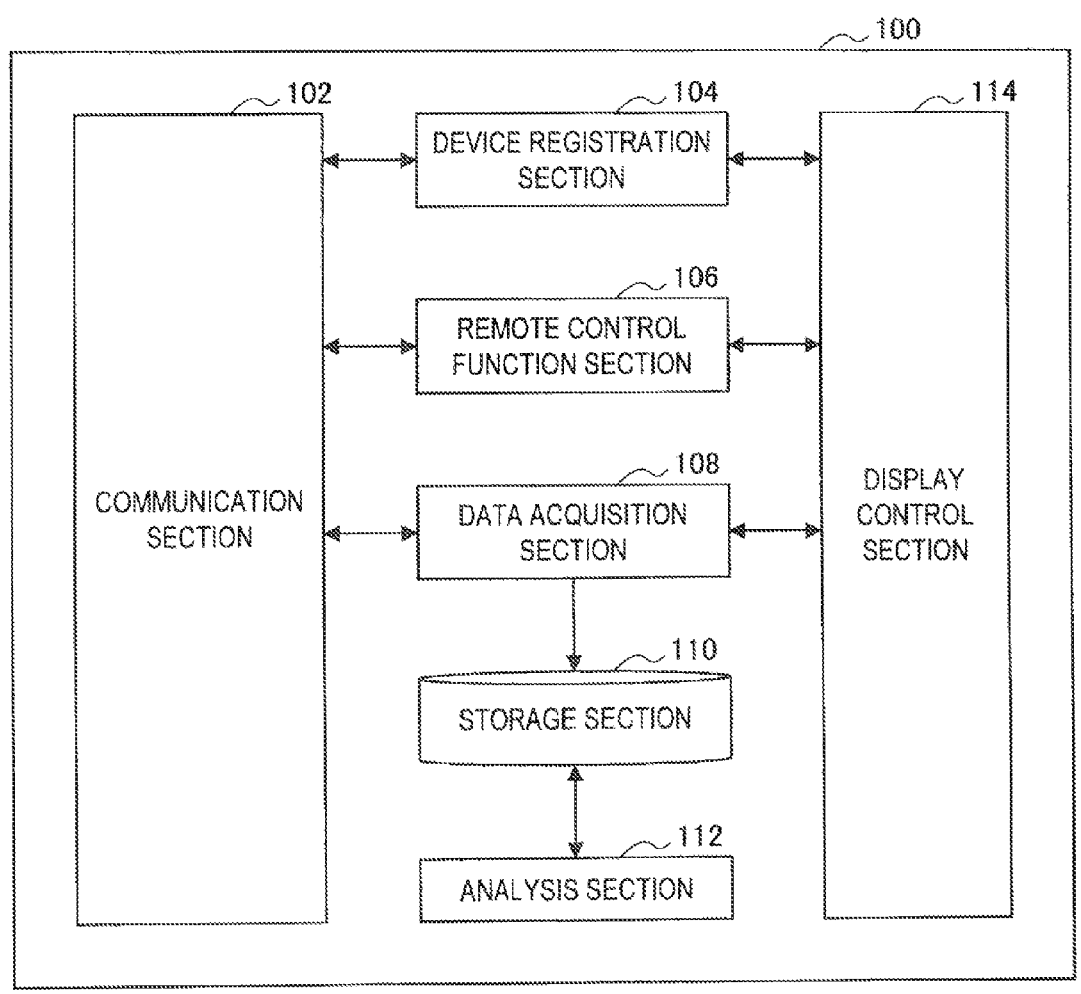
FIG. 2 is a functional configuration diagram of an information processing apparatus according to the embodiment.

Next, with reference to FIG. 2, an example of a functional configuration of the PC 100, which is an example of an information processing apparatus according to an embodiment of the present disclosure, will be described. FIG. 2 is a functional configuration diagram of an information processing apparatus according to the present embodiment.

The PC 100 as an example of the information processing apparatus according to the present embodiment mainly includes a communication section 102, a device registration section 104, a remote control function section 106, a data acquisition section 108, a storage section 110, an analysis section 112, and a display control section 114. However, the functions of the storage section 110 can be replaced with storage means connected to the outside of the PC 100 or an external storage means (for example, storage means of a cloud server) connected to the Internet 50. Further, there is considered a method of using the storage section 110 built in the PC 100 and the external storage means in combination. For example, there is considered a method of using the storage section 110 as a temporary storage and using the external storage means as a main storage. Such configurations are also included in the configuration examples of the PC 100 according to the present embodiment.

The communication section 102 is a communication interface configured from a communication device or the like for establishing a connection with a communication network such as the Internet 50. For example, in the case where the communication section 102 performs wireless communication, the communication section 102 may include a communication antenna for transmitting/receiving a signal used for the communication, a processing circuit for performing various types of signal processing for the communication, and the like. Further, the communication section 102 may be a communication interface for performing communication through wire. In the present embodiment, the communication section 102 is a wireless communication interface for establishing a connection with the wireless access point 450.

The device registration section 104 has a function of registering a device of which the PC 100 to perform remote control. In the present embodiment, the PC 100 performs remote control of an external apparatus using a Universal Network Remote (hereinafter, referred to as UNR) protocol to be described later, thereby being able to transmit/receive information. The UNR protocol defines a procedure of device registration in order to prevent from being operated by undesired external device. The device registration section 104 can register the device to be operated in accordance with the definition of the UNR protocol.

The remote control function section 106 has a remote control function of performing remote control of the device registered as the device to be operated by the device registration section 104. The remote control function section 106 can perform remote control of the device to be operated using an input device which is connected to the PC 100 or built in the PC 100, such as a keyboard, for example. The remote control function section 106 can change the channel of the registered TV 200, for example. Further, the remote control function section 106 can change the volume of the TV 200. Further, in the case where the TV 200 provides a display screen to which characters can be input, the remote control function section 106 can input characters to the display screen of the TV 200 by operating the input device such as a keyboard connected to the PC 100.

The data acquisition section 108 has a function of acquiring various types of data to be displayed on a display screen provided by the display control section 114. The data acquisition section 108 has a function as a content information acquisition section which acquires content information related to the content provided by the TV 200, for example. The content information acquired in this case can include, for example, information related to the program which is being viewed on the TV 200, information related to programs which can be viewed on the TV 200, information related to the sites which have been accessed by the TV 200, and information related to the applications which have been executed on the TV 200. Alternatively, the data acquisition section 108 functions as a search section which acquires related information retrieved from information stored in the internal storage section 110 or information that can be acquired through the Internet. The data acquisition section 108 which functions as the content information acquisition section stores the content information acquired from the TV 200 in the storage section 110. The data acquisition section 108 which functions as the search section can search for the related information based on the acquired content information. At this time, the data acquisition section 108 can acquire the related information related to broadcast program content which is being received by the TV 200 (that is, which is being viewed by the user of the TV 200), for example.

The storage section 110 has a function of storing various types of data used in the PC 100. The storage section 110 can include a storage medium, a recording device for recording data in the storage medium, a reading device for reading out the data from the storage medium, and a deletion device for deleting the data stored in the storage medium. Examples of the storage medium used here include a non-volatile memory such as a flash memory, an EEPROM (Electronically Erasable and Programmable Read Only Memory), an MRAM (Magnetoresistive Random Access Memory), a FeRAM (Ferroelectric Random Access Memory), and a PRAM (Phase change Random Access Memory), and a magnetic recording medium such as an HDD (Hard Disk Drive). In the present embodiment, the storage section 110 stores the content information acquired by the data acquisition section 108, history information in various types of application executed by the PC 100, and the like. Further, the storage section 110 can further store the analysis result obtained by the analysis section 112.

Note that, in the content information acquired by the data acquisition section 108, there are also included data type that should not be stored in the storage section 110 and data type that cannot be stored in the storage section 110. The pieces of content information of those data types may not be stored in the storage section 110. The pieces of content information of those data types are acquired by the data acquisition section 108 each time when they are used by applications. In this way, it is preferred that the method of acquiring the content information and the method of storing the content information be switched in accordance with the data type.

The analysis section 112 has a function of analyzing information related to the user of the PC 100 or the apparatus of which the PC 100 performs remote control, such as content information acquired by the data acquisition section 108 or the history information in the PC 100. The analysis section 112 can generate preference information of the user, for example. According to the configuration of the PC 100 according to the present embodiment, the preference information or the like can be generated based not only on an action history of the user inside the PC 100, but also on action history of the user in an external apparatus, such as the content information acquired by the data acquisition section 108.

The display control section 114 has a function of controlling display of the display screen displayed on a display device. The display control section 114 can control the display of the display screen, which is for registering, by the device registration section 104, an external apparatus as the device to be operated, for example. Alternatively, the display control section 114 can control the display of the display screen for the remote control function section 106 to operate the TV 200. Further, the display control section 114 can control the display of a display screen including at least one of the content information or the related information acquired by the data acquisition section 108. An example of the display screen controlled by the display control section 114 will be described later.

Heretofore, an example of the function of the PC 100 according to the present embodiment has been shown. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the PC 100 according to the present embodiment as described above, and the computer program can be implemented in a personal computer or the like. Further, there can also be provided a computer-readable recording medium in which the computer program is stored. Examples of the recording medium include a magnetic disk, an optical disc, a magneto-optical disk, and a flash memory. Further, the computer program may be distributed through a network, without using the recording medium, for example.

3. Hardware Configuration of Information Processing Apparatus

Figure 3:
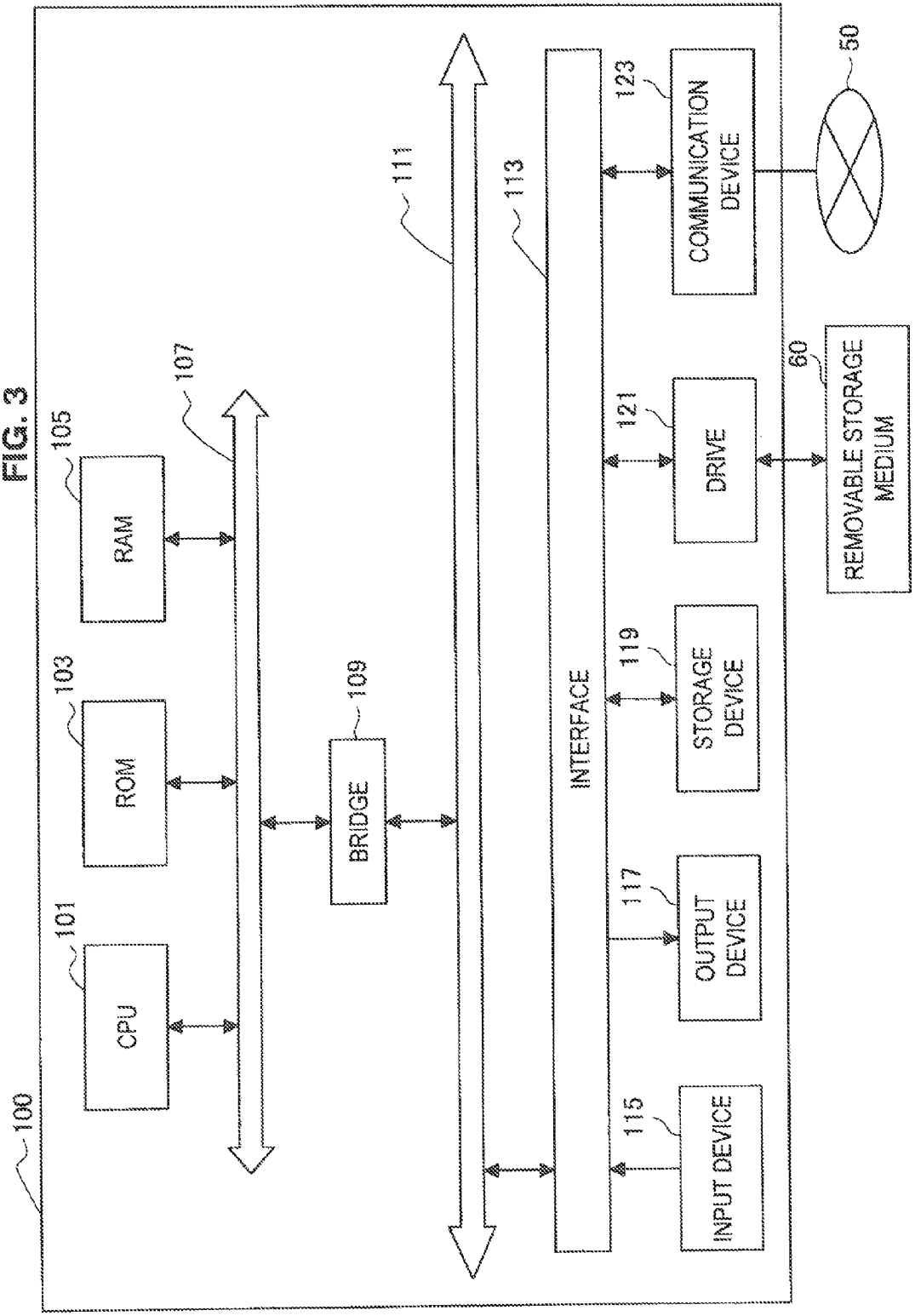
FIG. 3 is a hardware configuration diagram of the information processing apparatus according to the embodiment.

Next, with reference to FIG. 3, an example of a hardware configuration of the PC 100, which is an example of the information processing apparatus according to an embodiment of the present disclosure, will be described. FIG. 3 is a hardware configuration diagram of the information processing apparatus according to the present embodiment.

The PC 100 includes a CPU (Central Processing Unit) 101, a ROM (Read Only Memory) 103, a RAM (Random Access Memory) 105, a host bus 107, a bridge 109, an external bus 111, an interface 113, an input device 115, an output device 117, a storage device 119, a drive 121, and a communication device 123.

The CPU 101 functions as an arithmetic processing unit and a control unit, and controls entire operation of the PC 100 in accordance with various programs. Further, the CPU 101 may be a microprocessor. The ROM 103 stores a program, a calculation parameter, and the like used by the CPU 101. The RAM 105 temporarily stores a program used in execution of the CPU 101, a parameter varying as appropriate during the execution, and the like. They are connected with each other via the host bus 107 configured from a CPU bus or the like.

The host bus 107 is connected to the external bus 111 such as a PCI (Peripheral Component Interconnect/Interface) bus through the bridge 109. Note that it is not necessary that the host bus 107, the bridge 109, and the external bus 111 be configured separately, and the functions thereof may be implemented in one bus.

The input device 115 is configured from, for example, input means for inputting information by a user, such as a mouse, a keyboard, a touch panel, a button, a microphone, a switch, and a lever, and an input control circuit which generates an input signal based on the input by the user and outputs the generated input signal to the CPU 101. The user of the PC 100 can input desired operation information to the display screen by operating the input device 115.

The output device 117 is configured from, for example, display devices such as a liquid crystal display (LCD) device, an OLED (Organic Light Emitting Diode) device, a CRT (Cathode Ray Tube) display device, and a lamp, and audio output devices such as a speaker and headphones. The output device 117 outputs reproduced content, for example. Specifically, the display device displays various types of reproduced information such as video data in text or image form. On the other hand, the audio output device converts reproduced audio data or the like into a sound and outputs the sound.

The storage device 119 is a device for storing data, which is configured as an example of the storage section of the PC 100 according to the present embodiment, and can include a storage medium, a recording device for recording data in the storage medium, a reading device for reading out the data from the storage medium, and a deletion device for deleting the data recorded in the storage medium.

Examples of the storage medium to be used here include a magnetic recording medium such as an HDD (Hard Disk Drive), and a non-volatile memory such as an EEPROM (Electronically Erasable and Programmable Read Only Memory), a flash memory, an MRAM (Magnetoresistive Random Access Memory), a FeRAM (Ferroelectric Random Access Memory), and a PRAM (Phase change Random Access Memory).

The drive 121 is a reader/writer for the storage medium and is built in or externally attached to the PC 100. The drive 121 reads out information recorded in a removable storage medium 60 which is mounted thereto, such as a magnetic disk, an optical disc, a magneto-optical disk, or a semiconductor memory, and outputs the information to the RAM 105.

The communication device 123 is a communication interface which is configured from, for example, a communication device for establishing a connection with the Internet 50. In addition, the communication device 123 may be a wireless LAN (Local Area Network)-enabled communication device, a wireless USB-enabled communication device, or a wired communication device for performing wired communication.

4. Functional Configuration of Television Receiver

Figure 4:
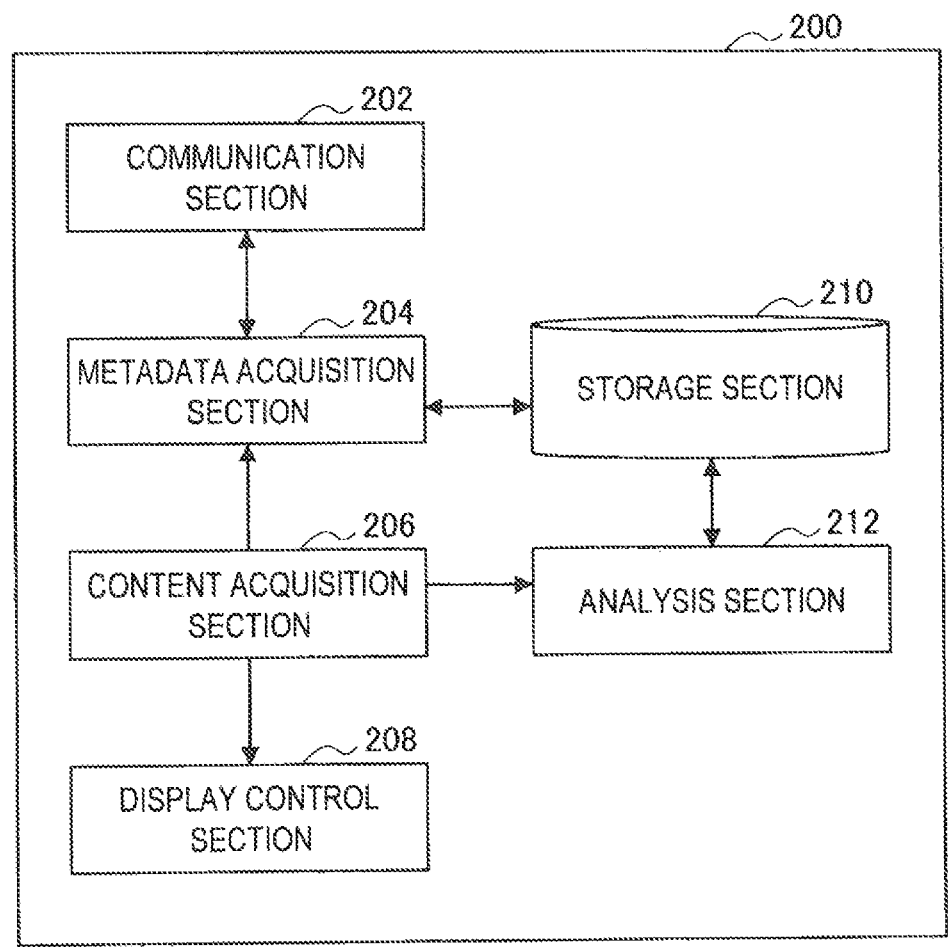
FIG. 4 is a functional configuration diagram of a television receiver according to the embodiment.

Next, with reference to FIG. 4, an example of a functional configuration of a television receiver according to the present embodiment will be described. FIG. 4 is a functional configuration diagram of a television receiver according to the present embodiment.

The TV 200 mainly includes a communication section 202, a metadata acquisition section 204, a content acquisition section 206, a display control section 208, a storage section 210, and an analysis section 212. Further, the TV 200 can connect to the home network 30 through the communication section 202, and can operate in accordance with operation information input via the home network 30.

Note that the functions of the storage section 210 can be replaced with storage means connected to the outside of the TV 200 or an external storage means (for example, storage means of a cloud server) connected to the Internet 50. Further, there is considered a method of using the storage section 210 built in the TV 200 and the external storage means in combination. For example, there is considered a method of using the storage section 210 as a temporary storage and using the external storage means as a main storage. Such configurations are also included in the configuration examples of the TV 200 according, to the present embodiment.

The communication section 202 is a communication interface configured from a communication device or the like for establishing a connection with communication networks such as the home network 30 and the Internet 50. For example, in the case where the communication section 202 performs wireless communication, the communication section 202 may include a communication antenna for transmitting/receiving a signal used for the communication, a processing circuit for performing various types of signal processing for the communication, and the like. Further, the communication section 202 may be a communication interface for performing communication through wire. In the present embodiment, the communication section 202 is a communication interface for establishing a connection through wire.

The metadata acquisition section 204 has a function of acquiring content information related to content acquired by the content acquisition section. For example, the metadata acquisition section 204 can acquire metadata included in the content acquired by the content acquisition section 206 as it is as the content information. Alternatively, the metadata acquisition section 204 may acquire content information generated by the analysis executed by the analysis section 212 based on the content acquired by the content acquisition section 206.

The metadata acquisition section 204 transmits the acquired content information to the PC 100 through the communication section 202.

The content acquisition section 206 has a function of acquiring content provided by the TV 200. For example, the content acquisition section 206 may function as an image receiving section which acquires TV program content by receiving a broadcast wave provided by the broadcast station. Alternatively, the content acquisition section 206 may acquire content provided by being connected to the Internet 50 through the communication section 202. The content acquired here may be, for example, video content, application content, or content including music data such as music, a lecture, and a radio program.

The display control section 208 may include a display device which displays a display screen and a control section which controls the operation of the display device. The display control section 208 can provide a broadcast program acquired by the content acquisition section 206. Alternatively, the display control section 208 can provide various types of information (for example, information of data broadcasting and the like) that is associated with the broadcast program to be provided. Alternatively, in the case where the content acquisition section 206 acquires program content such as an application through a network, the display control section 208 can control the display screen such that the program is executed and provided.

The storage section 210 has a function of storing various types of data used in the TV 200. The storage section 210 can include a storage medium, a recording device for recording data in the storage medium, a reading device for reading out the data from the storage medium, and a deletion device for deleting the data stored in the storage medium. Examples of the storage medium used here include a non-volatile memory such as a flash memory, an EEPROM (Electronically Erasable and Programmable Read Only Memory), an MRAM (Magnetoresistive Random Access Memory), a FeRAM (Ferroelectric Random Access Memory), and a PRAM (Phase change Random Access Memory), and a magnetic recording medium such as an HDD (Hard Disk Drive). The storage section 210 can store the analysis result obtained by the analysis section 212, for example.

The analysis section 212 can generate content information by analyzing the content acquired by the content acquisition section 206. Further, the analysis section 212 can also analyze the user's preference based on the content information and user history information stored in the storage section 210. The analysis section 212 may store the analysis result in the storage section 210.

Heretofore, an example of the function of the TV 200 according to the present embodiment has been shown. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

5. Outline of UNR Protocol

In the above, the description has been made on the information processing system in which the PC 100 operates the operation of the TV 200. The information processing system is realized by using a protocol (in this specification, this protocol is referred to as UNR protocol) which defines a processing procedure of, between a plurality of devices connected to each other through a network, operating by one device another device, transmitting/receiving information, and monitoring the state.

The UNR protocol is a protocol which is defined such that IP (Internet Protocol) network-enabled devices perform operation between the devices, and thereby enabling the information of the devices, character string information, content information, and the like to be transferred therebetween. Further, the UNR protocol is used between a device having the client function and a device having the server function. In the example described above, the PC 100 has the client function and the TV 200 has the server function. With such a configuration, the PC 100 and the TV 200 can realize each of the functions described above. Hereinafter, the device having the server function in the UNR protocol is referred to as UNR server, and the device having the client function in the UNR protocol is referred to as UNR client.

Here, the UNR server and the UNR client may be associated with each other on a one-to-one basis through a LAN or a Wireless LAN in a home network, for example. Further, a plurality of UNR clients may be associated with one UNR server. Alternatively, a plurality of UNR servers may be associated with one UNR client.

The UNR server and the UNR client can each detect a device to be connected to, and can also each realize a device-control function which is equivalent to that of the infrared remote controller-control, by mainly using a UPnP (Universal Plug and Play) and a IRCC-IP (Infrared Compatible Control Over Internet Protocol) which is obtained by IP-networking an infrared remote controller-control code. Further, the UNR server and the UNR client each realize device control and transfer of information that cannot be realized by the IRCC-IP, by using a CERS-API (Consumer Electronics Remote Service-API). The CERS-API is an API which uses an HTTP request.

Hereinafter, there will be described operation examples of the information processing system according to the present embodiment, which are realized by using functions of the UNR server and the NR client described above.

6. Operation Examples 6-1. Device Connection Operation

Figure 5:
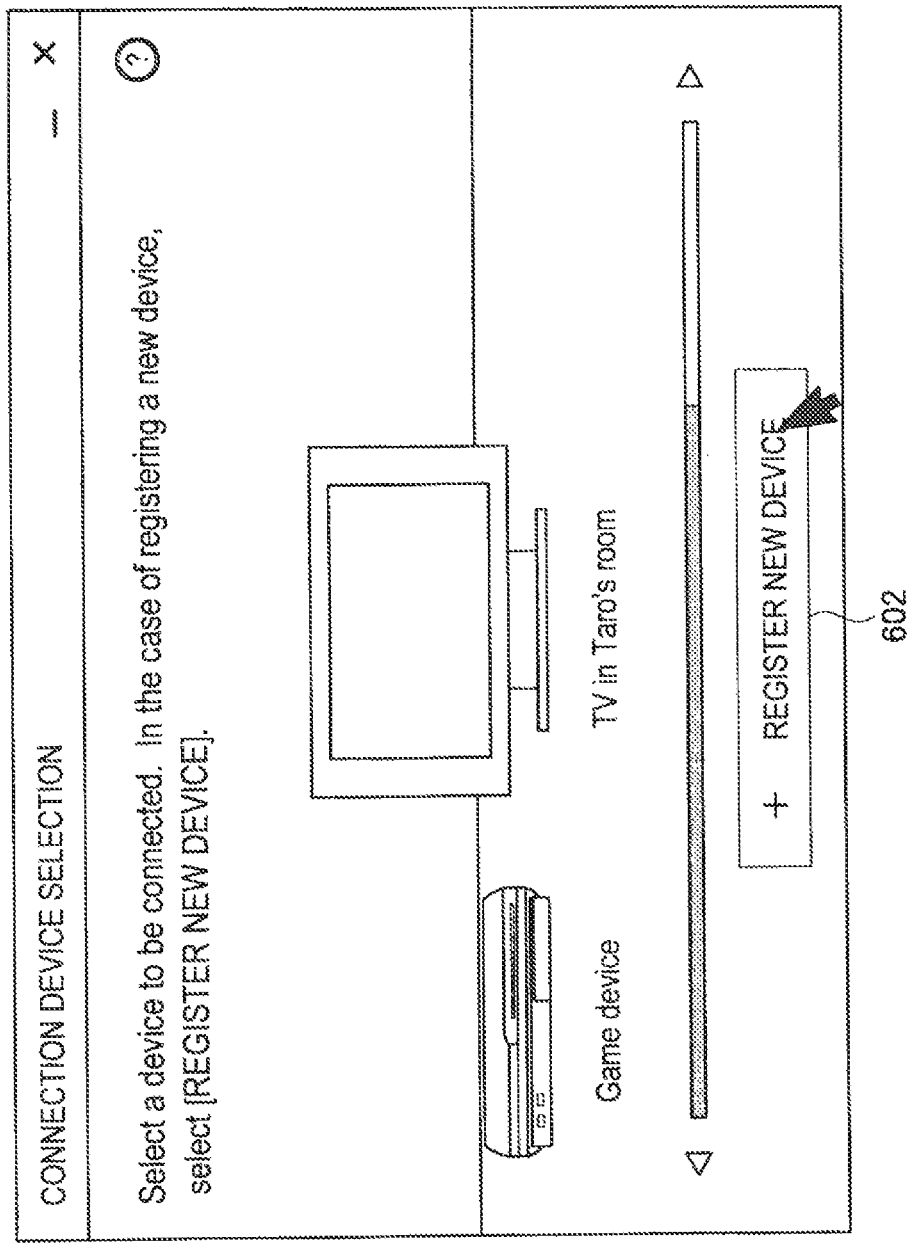
FIG. 5 is an explanatory diagram showing an example of a connection device selection screen of the information processing apparatus according to the embodiment.
Figure 6:
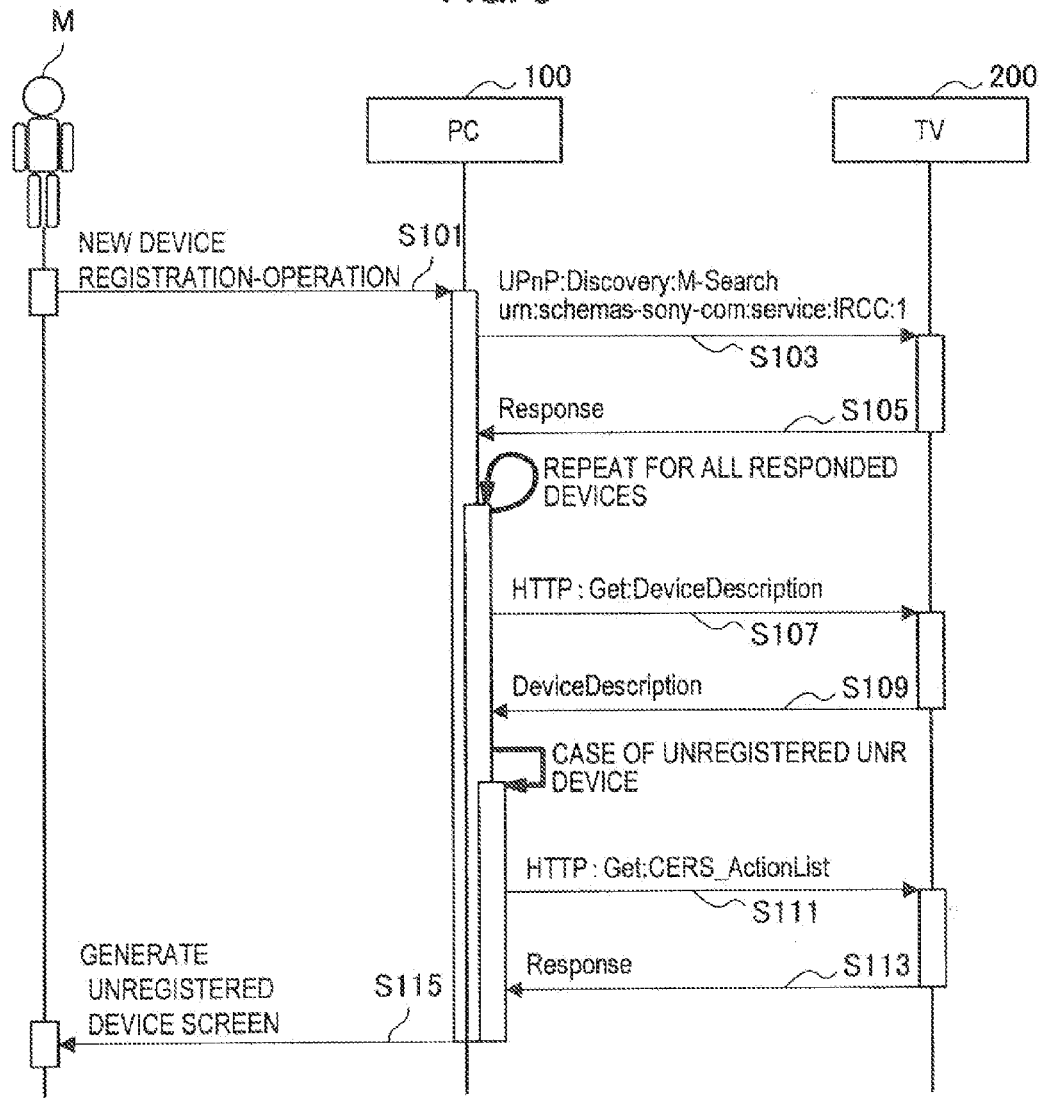
FIG. 6 is a sequence diagram showing device search processing performed in the information processing system according to the embodiment.
Figure 7:
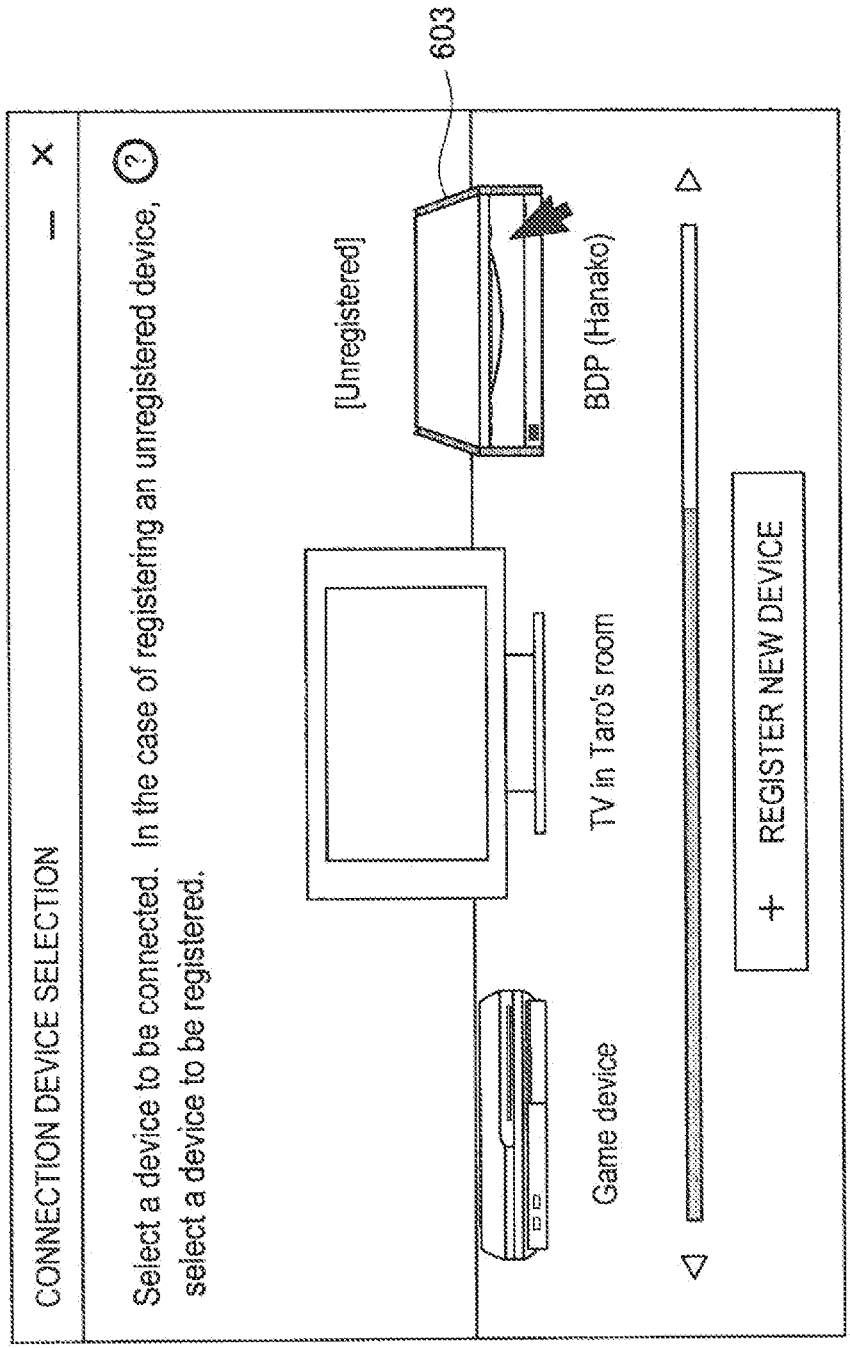
FIG. 7 is an explanatory diagram showing an example of the connection device selection screen including an unregistered device according to the embodiment.
Figure 8:
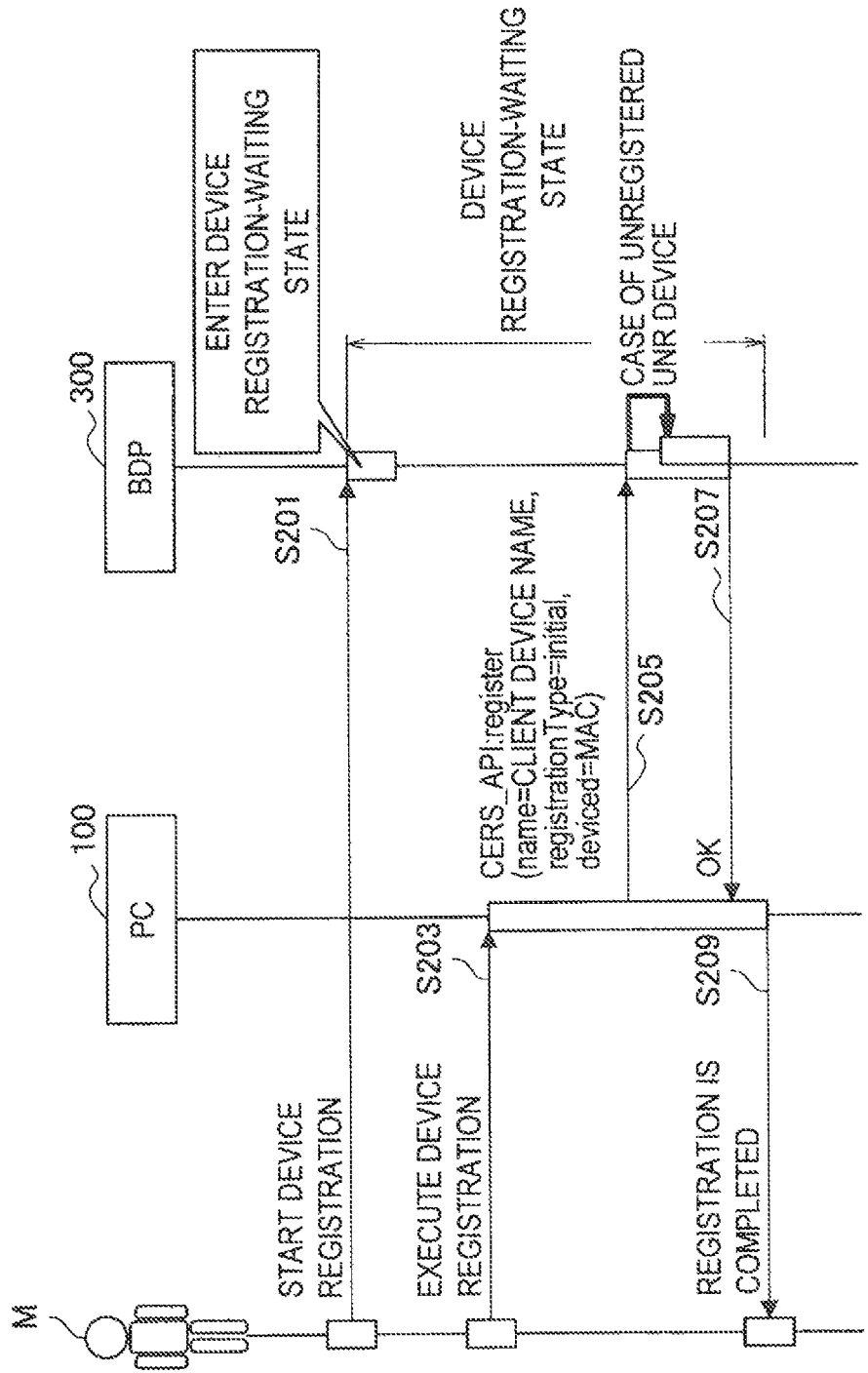
FIG. 8 is a sequence diagram showing device registration processing performed in the information processing system according to the embodiment.

First, with reference to FIGS. 5 to 8, operations for connecting devices to each other will be described. FIG. 5 is an explanatory diagram showing an example of a connection device selection screen of the information processing apparatus according to the present embodiment. FIG. 6 is a sequence diagram showing device search processing performed in the information processing system according to the present embodiment. FIG. 7 is an explanatory diagram showing an example of the connection device selection screen including an unregistered device according to the present embodiment. FIG. 8 is a sequence diagram showing device registration processing performed in the information processing system according to the present embodiment.

First, a user M operates the PC 100 which functions as the UNR client, and searches for a UNR server, registers the UNR server, and starts up an application for establishing connection with the server. Hereinafter, the function provided by the application is referred to as remote keyboard function. When the application is started up, the connection device selection screen shown in FIG. 5 is displayed. Here, on the connection device selection screen, there are displayed the devices which have already been registered as devices that the PC 100 can connect to. In the case where the user M wants to register a new device other than the displayed devices, the user M presses "REGISTER NEW DEVICE" button 602.

When the user M presses the "REGISTER NEW DEVICE" button 602, the device search processing shown in FIG. 6 is executed. Referring to FIG. 6, first, when the user M presses the "REGISTER NEW DEVICE" button 602 (S101), the PC 100 transmits a UPnP search message to a device which the PC 100 can connect to through the home network 30, such as the TV 200 (S103). The PC 100 receives a response from each device which the PC 100 can connect to through the home network 30, such as the TV 200 (S105). Then, the PC 100 transmits a "DeviceDescription" acquisition request to the device which has sent the response with respect to the device-search message (S107). A device such as the TV 200 sends back "DeviceDescription" in response to the request of Step S107 (S109).

The PC 100 determines whether each device is a UNR device based on the information included in the acquired "DeviceDescription". Then, whether the UNR device is registered/unregistered in the PC 100 is determined. Whether the device is the UNR device is determined based on whether an "X_UNR_DeviceInfo" tag is present in "DeviceDescription". That is, in the case where the "X_UNR_DeviceInfo" tag is present in the "DeviceDescription", it is determined that the device is the UNR device, and in the case where the "X_UNR_DeviceInfo" tag is not present in the "DeviceDescription", it is determined that the device is not the UNR device. Further, whether a device is registered/unregistered in the PC 100 is determined based on whether the device is included in a registration list held within the PC 100.

Further, the PC 100 transmits a "CERS_ActionList" acquisition request to the unregistered UNR device (S111). The device which receives the acquisition request of Step S111 sends back "CERS_ActionList" (S113). The above processing is repeated to the device which sends the response, and then the PC 100 generates, and provides the user M with, an unregistered device screen (S115).

Here, FIG. 7 shows the unregistered device screen. In this screen, the unregistered device recognized in the device search processing of FIG. 6 is shown side-by-side with the already registered devices. In this screen, when the unregistered device is selected, the device registration processing shown in FIG. 8 is executed. Here, let us assume that the BDP 300 is in an unregistered state, and there will be described a flow of operation for registering the BDP 300.

For the device registration, first, the user M operates the BDP 300, which is the device to be registered, and gives an instruction to start the device registration (S201). Then, the BDP 300 enters a device registration-waiting state. In this state, the user M selects a BDP icon 603 on the unregistered device screen shown in FIG. 7, and thereby giving an instruction to execute the device registration (S203), the PC 100 transmits a "CERS_API" registration command to the BDP 300 (S205). The value of "registrationType", initial, indicates that it is a new registration. In response to the command of Step S205, the BDP 300 executes registration processing in accordance with UNR definition. After that, when the PC 100 is notified of the fact that the registration processing of the BDP 300 is completed (S207), the PC 100 generates a screen for notifying the user M of the fact that the registration is completed and provides the screen to the user M (S209).

6-2. Remote Control Operation

Figure 9:
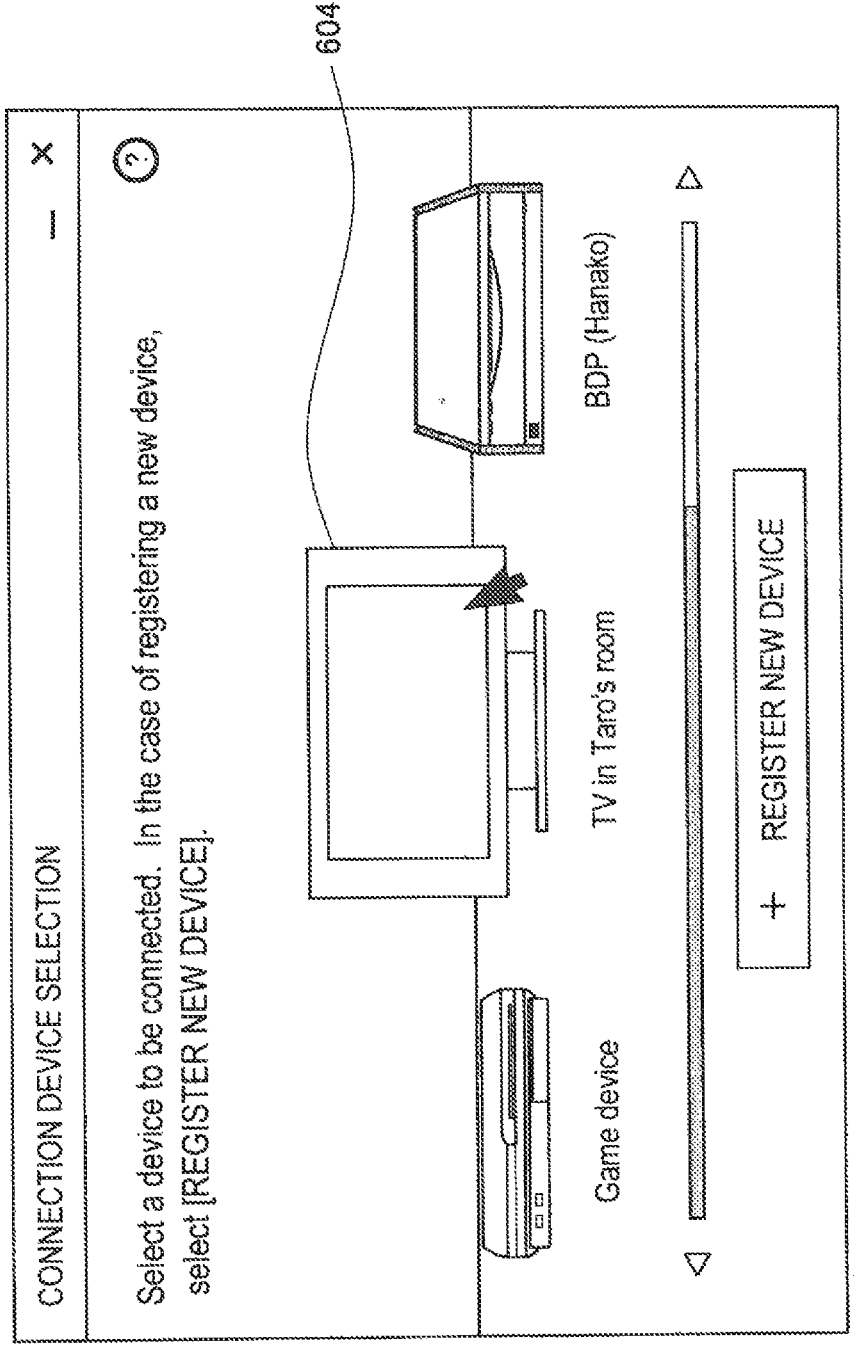
FIG. 9 is an explanatory diagram showing an example of the connection device selection screen of the information processing apparatus according to the embodiment.
Figure 10:
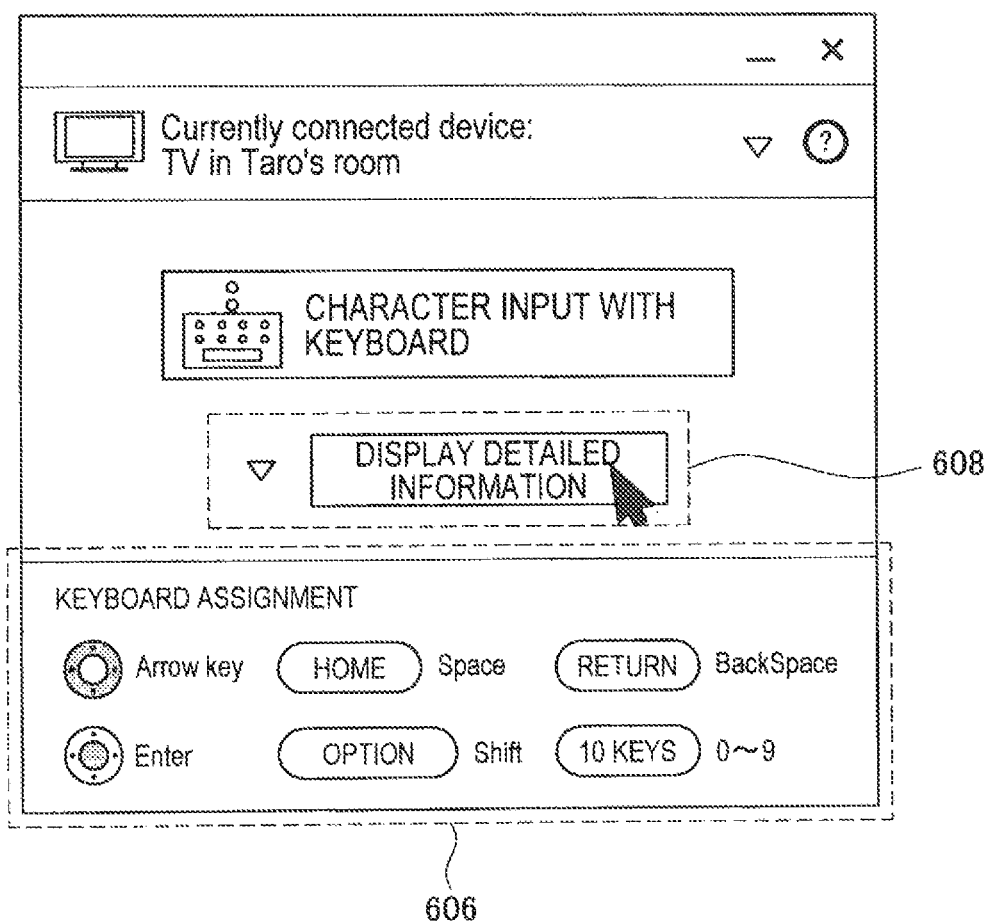
FIG. 10 is an explanatory diagram showing an example of a remote keyboard function-operation screen of the information processing apparatus according to the embodiment.

Next, with reference to FIGS. 9 to 11, operations for performing remote control of a connection device will be described. FIG. 9 is an explanatory diagram showing an example of the connection device selection screen of the information processing apparatus according to the present embodiment. FIG. 10 is an explanatory diagram showing an example of a remote keyboard function-operation screen of the information processing apparatus according to the present embodiment. FIG. 11 is a sequence diagram showing processing of acquiring a state of the information processing system according to the present embodiment.

When the registration processing of the BDP 300 is completed, there is provided a connection device selection screen shown in FIG. 9, for example. Here, the user M can select a device to be operated. Here, the case where the TV 200 is operated will be described. Accordingly, the user M selects an icon 604, which represents the TV 200, on the connection device selection screen shown in FIG. 9. Then, a remote keyboard function screen shown in FIG. 10 is displayed, for example.

The PC 100 can operate the TV 200 by operating a keyboard in accordance with a keyboard assignment 606 shown on the remote keyboard function screen. For example, when the user M performs remote control operation using the keyboard in accordance with the keyboard assignment 606 (S301), the PC 100 transmits the input key (S303), and the TV 200 operates in accordance with the transmitted key. Further, the TV 200 sends back a response to the PC 100 (S305).

Further, the PC 100 polls the state of the TV 200 at regular intervals by using a "getStatus" action. For example, the PC 100 can perform polling twice per second. For example, in the example shown in FIG. 11, in response to the state acquisition action (S307) from the PC 100, the TV 200 sends "TextInput" representing a character string-input state (S309). As the state of the TV 200, there is considered a currently-viewing state, for example, in addition to the character string-input state. Further, in the case of the BDP 300, there is considered a disc inserted state. The TV 200 may send back one state, or a plurality of states. Alternatively, there is also a case where the TV 200 does not send back a state.

For example, in the case where the TV 200 sends back the character string-input state, the TV 200 is in a state capable of transmitting/receiving a character string. Further, in the case where the TV 200 sends back the currently-viewing state, the currently-viewing state may include class information (such as video, music, and URL) of the content being viewed, source information (such as CD, DVD, BD, Broadcast, ExtInput, and Net) of the content being viewed, information related to reproduction time of the content being viewed, and information of reproduction rate of the content being viewed.

Further, in the case where the BDP 300 sends back the disc inserted state, the BDP 300 may include therein information on the type of the inserted disc, and may transmit the disc inserted state to the PC 100.

6-3. Display Operation of Detailed Screen

Figure 13:
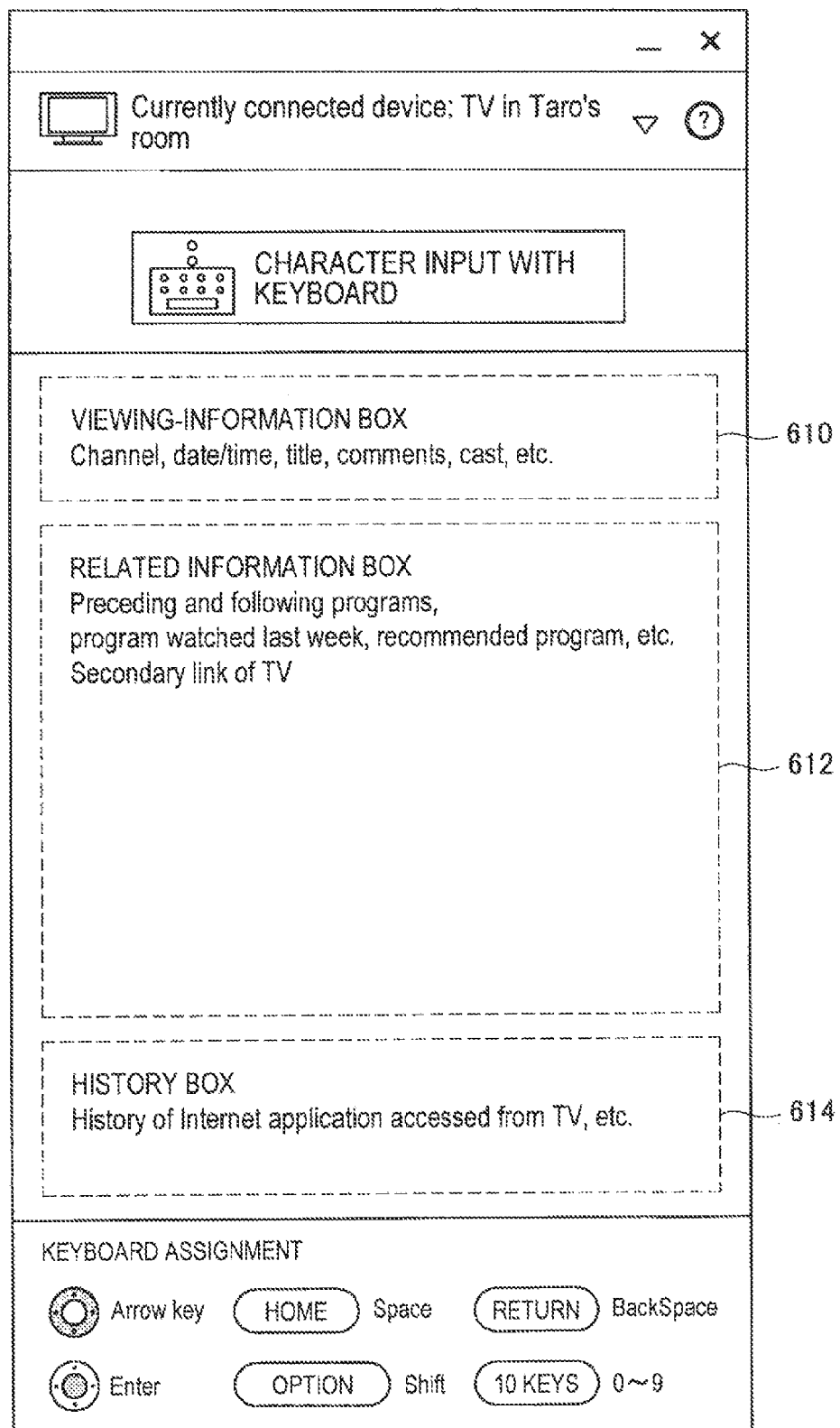
FIG. 13 is an explanatory diagram showing an example of a screen displaying detailed information of remote keyboard functions of the information processing apparatus according to the embodiment.

Next, with reference to FIG. 10, FIG. 12, and FIG. 13, display operations of a detailed screen will be described. FIG. 12 is a sequence diagram showing detailed information screen-display processing performed in the information processing system according to the present embodiment. FIG. 13 is an explanatory diagram showing an example of a screen displaying detailed information of remote keyboard functions of the information processing apparatus according to the present embodiment.

Further, in the remote keyboard function screen shown in FIG. 10, when the user M presses a "display detailed information" button 608, the content information acquisition processing shown in FIG. 12 is executed. Note that, the content information acquisition processing may be executed at a predetermined timing regardless of whether the user M presses the "display detailed information" button 608, and the detailed information screen may be displayed at a timing at which the user M presses the "display detailed information" button 608. However, here, the description will be continued on the assumption that the processing shown in FIG. 12 is executed at a timing at which the user M presses the "display detailed information" button 608.

When the user M presses the "display detailed information" button 608 shown in FIG. 10 (S401), the PC 100 executes a "getContentInformation" action of "CERS_API" to the TV 200 (S403). In response to the action of Step S403, the TV 200 transmits content information as a response (S405). The PC 100 stores the acquired content information in the storage section 110, and also generates a detailed information screen based on the content information and provides the user M with the detailed information screen (S407).

FIG. 13 shows an example of the detailed screen. For example, the detailed screen can include a viewing-information box 610 containing information on the broadcast program content which is being viewed, a related information box 612 containing related information retrieved from pieces of information inside and outside of the PC 100 based on the acquired content information, and a history box 614 containing history information related to content provided by the TV 200. In the history box 614, history information of Internet applications accessed by the TV 200, and the like are included, for example. When the content provided by the TV 200 is changed, the detailed screen may be updated in accordance with the change.

The PC 100 can activate a browser in a separate window while being in the state in which the detailed screen is displayed. Further, a keyboard is connected to or built in the PC 100. Accordingly, the user M can copy a character string displayed on the detailed screen and can paste the character string in a search box of the browser, for example. In this way, the convenience of using information displayed on the detailed screen is remarkably enhanced. For example, when attempting to use the detailed information displayed on the display device of the TV 200, it becomes unnecessary to perform typing to the PC 100 while referring to the screen of the TV 200.

Further, in the related information box 612, information such as a recommended program based on the content information may be contained. In this case, the information displayed in the related information box 612 may be linked to Internet content. According to such a configuration, the user M can view other content of interest only by clicking the character string displayed in the related information box 612. Further, by clicking information displayed in the related information box 612, the remote control function section 106 may be operated and a channel of the TV 200 may be changed.

Further, the following configuration can also be considered regarding music content played in the TV 200. For example, the content information of the music content played in the TV 200 may be displayed in chronological order in the related information box 612. Further, based on content information of music content a part of which is played in the TV 200, the user M may be notified, using the related information box 612, that a music piece corresponding to the music content or another music piece (with the same artist or genre) related to the music piece is included in the device connected to the home network 30.

According to such a configuration, the user M is made aware that there is a target music piece under management of the storage section 110 of the PC 100 or the DLNA, and it becomes possible that the user M recognizes that the music piece can be fully reproduced. Of course, the related information box 612 may display directly that a music piece which can be fully reproduced is included in the home network 30. The user M, who sees such a display can reproduce and enjoy the music piece later. Note that the location of the music piece (whether it is in the PC 100 or in another device) may be displayed in the related information box 612.

Here, the function of displaying content information of music content in the related information box 612 will be described in more detail.

There is considered a service for searching for a music piece a part of which is played in the TV 200 or a music piece related to the music piece. When viewing the TV 200, we realize that another music piece such as BGM is played during a program, during a commercial, during playback of a BD film, or during playing a game. No attention is paid to such a music piece in many cases, but sometimes, there may be occasions that we feel "nostalgic", "like it", "want to listen to it more", and the like. However, since a music piece like BGM finishes within several seconds in many cases, it may be difficult that the user M who has listened to the music piece finds the music piece by using as a clue a fragment of the music piece that the user M has listened to. Therefore, it is beneficial to the user M that the user M is notified of the information of the music piece played in the TV 200, moment by moment.

Further, many users M each manage music piece data in the PC 100 or the like. In some cases, there may be a user M who manages the music piece data in a device within the home network 30, such as a DLNA server. Further, occasions in which the user M who purchases the music piece data through the Internet 50 are also increasing. For those reasons, the user M may want to know, as information of the music piece played in the TV 200, information as to whether there is the music piece under the management of the user M, whether the music piece is in a state that music piece can be purchased through the Internet 50, and the like. In addition, if the user M can bookmark the music piece that the user M likes among the music pieces played in the TV 200, it can be considered that the convenience is enhanced.

Figure 14:
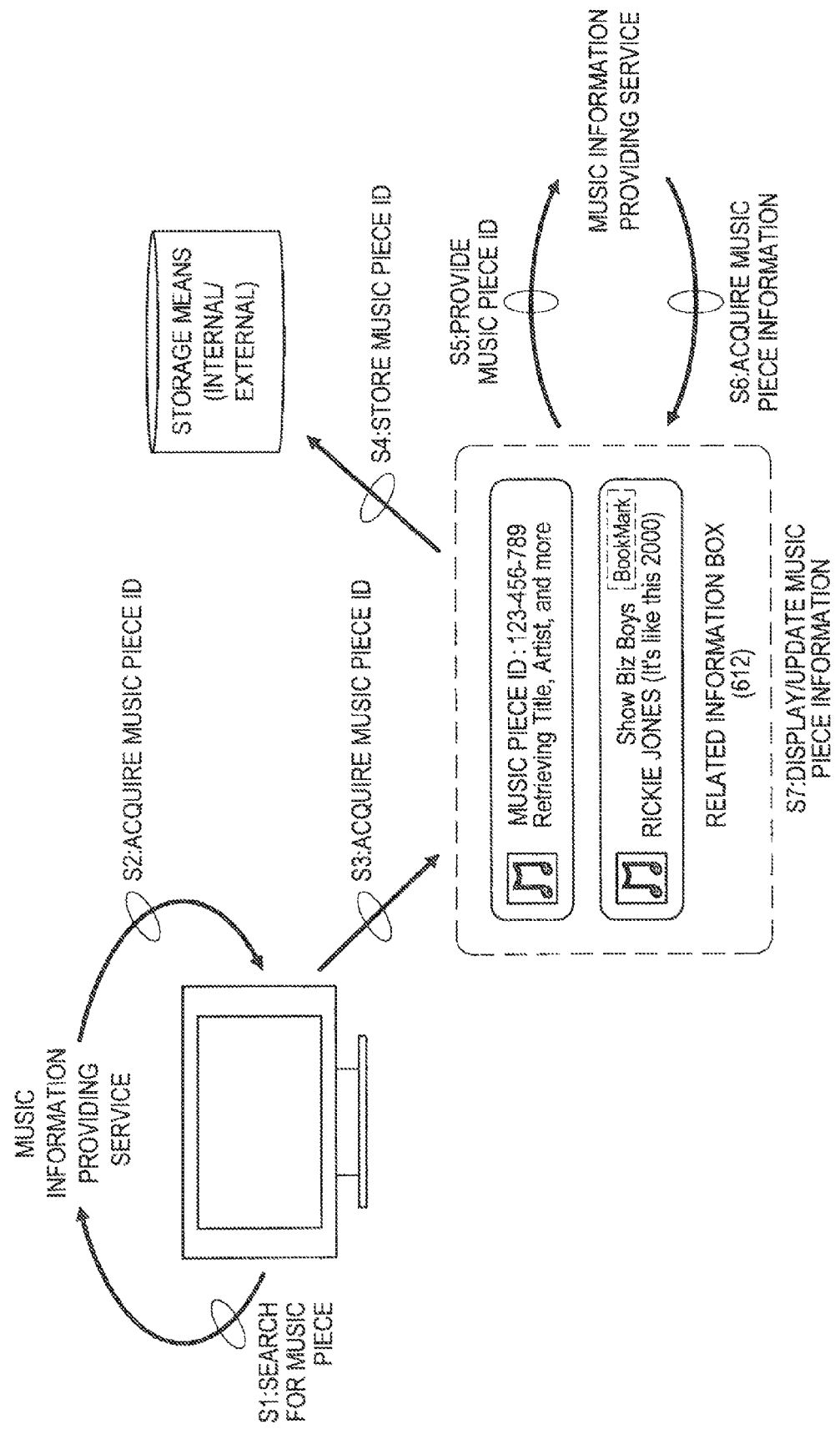
FIG. 14 is an explanatory diagram showing a flow of processing on a method of acquiring music piece information and a method of displaying the music piece information according to the embodiment.

For example, information of a music piece is displayed in the related information box 612 in the mechanism shown in FIG. 14. First, the TV 200 executes a search for the music piece (S1). In this case, for example, the TV 200 accesses a music information providing service through the Internet 50, and searches for the information of the music piece which has been played using the music information providing service. When the desired music piece is detected, the music information providing service provides the TV 200 with a music piece ID of the detected music piece (S2). Next, the TV 200 passes the music piece ID acquired from the music information providing service to the PC 100 (S3). After that, the PC 100 stores the music piece ID acquired from the TV 200 in the storage section 110 or in an external storage means (S4).

Next, the PC 100 provides the music information providing service with the music piece ID acquired from the TV 200 (S5), and acquires the music piece information corresponding to the music piece ID (S6). Then, the PC 100 displays the music piece information acquired from the music information providing service in the related information box 612 (S7). Note that, in the case where the PC 100 acquires a new music piece ID from the TV 200 or in the case where the music piece information is updated in the music information providing service, the PC 100 provides the music information providing service with the music piece ID, re-acquires music piece information, and replace the display content of the related information box 612 with the acquired music piece information. According to such a mechanism, the music piece information of the music piece played in the TV 200 can be displayed in the related information box 612.

Figure 15:
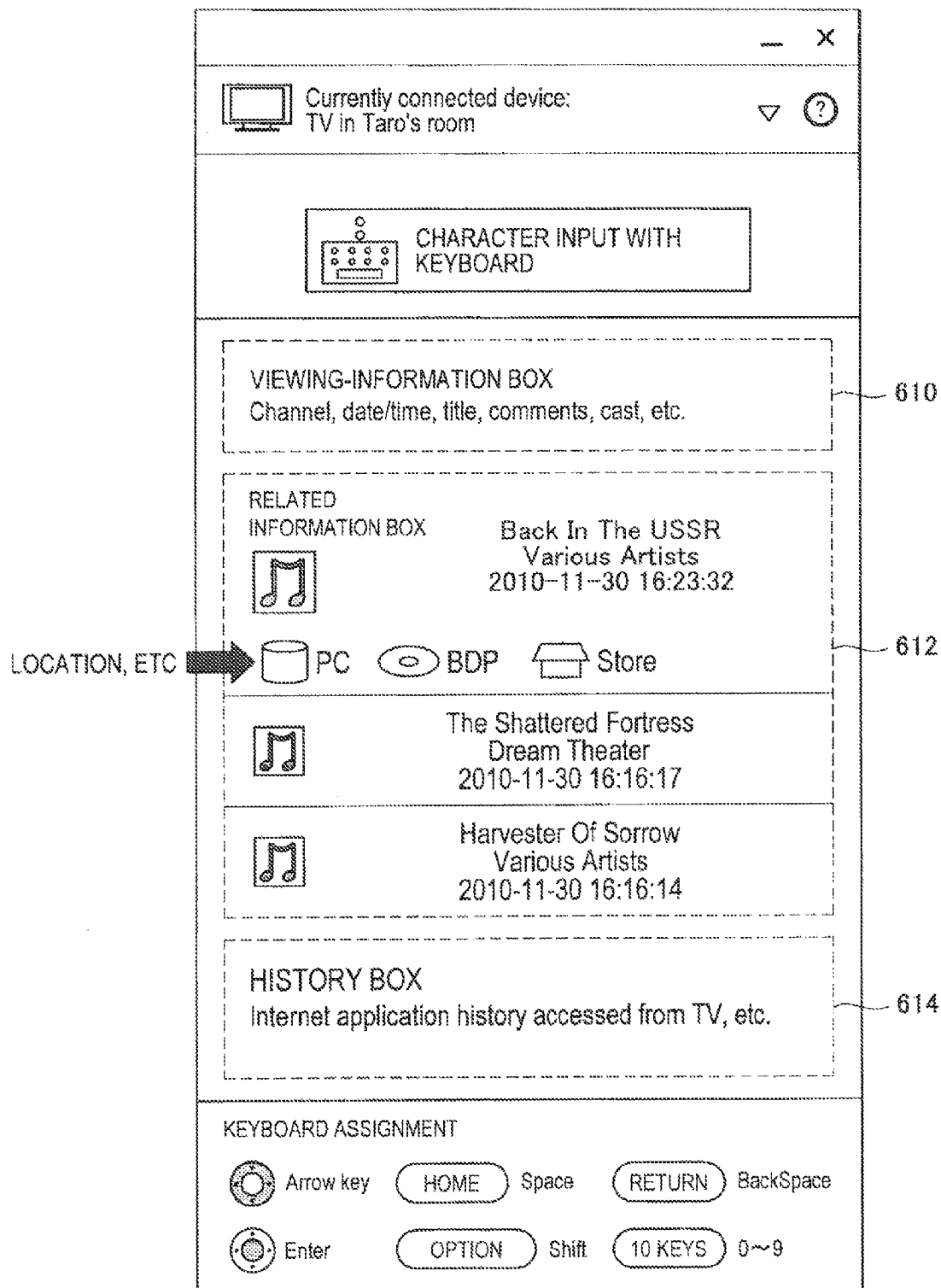
FIG. 15 is an explanatory diagram showing an example of the screen displaying detailed information of the remote keyboard functions of the information processing apparatus according to the embodiment.

For example, as shown in FIG. 15, in the related information box 612, there are displayed music piece information, locations of the music piece, and the like. Note that the PC 100 or the TV 200 can search for the location of the music piece stored in the storage section 110 or in the external storage means of the PC 100 by using the music piece ID. Accordingly, as shown in FIG. 15, the PC 100 can display the detected location of the music piece in the related information box 612. Further, the PC 100 can also use the music piece ID to perform a search as to whether the music piece corresponding to the music piece ID is purchasable through the Internet 50. For example, the PC 100 accesses music piece-selling site on the Internet 50 and searches for the music piece by setting the music piece ID as a search key, thereby detecting whether the music piece is in the purchasable state.

By applying such a configuration, when the user M wants to fully reproduce a music piece played in the TV 200, it becomes possible for the user M to quickly recognize the existence of the music piece, or to quickly purchase the music piece. Further, by pressing a "Bookmark" button in the related information box 612 shown in FIG. 14, the music piece can be easily bookmarked. As a result thereof, the user M can fully reproduce and enjoy the music piece played in the TV 200 anytime the user M likes.

7. Examples of Effects

As described above, according to the information processing system according to an embodiment of the present disclosure, the information based on the operation of the TV 200 can be used in the PC 100, such as the information on a broadcast program to be viewed in the TV 200 and history information of the Internet application accessed from the TV 200.

Further, the PC 100 stores the acquired content information in the storage section 110 built in the PC 100, and thereby being capable of reflecting, on the analysis of user's preference, information such as a program-viewing history and an Internet application-execution history on the TV 200.

Further, the PC 100 can display the acquired content information and the related information retrieved based on the content information on the display screen of the PC 100. Accordingly, the user can see the attached information while continuing to view a program in a full-screen mode on the TV 200.

Further, the PC 100 can activate another application such as a browser in parallel with the detailed screen based on the content information. Consequently, the user M performs copy and paste of any character string from content information, and thereby being capable of easily performing an Internet search and related video reproduction. Further, with the operation performed to the detailed screen, the TV 200 can be operated based on the displayed related information. Specifically, by clicking a character string displayed in the related information box 612, the channel of the TV 200 may be changed to the program that the clicked character string indicates. According to such a configuration, the display can be easily switched to the content of interest while seeing the detailed screen.

Further, also after the TV 200 enters into a standby state or a power-down state and the connection between the TV 200 and the PC 100 is cut off, the PC 100 can update and display the related information box of the detailed screen based on the content information which has been acquired up to then. For example, from the channel information which has been viewed, the content information of the program which can be viewed may be acquired and displayed, based on the current time. Alternatively, there may be displayed a result obtained by a keyword search which is performed based on the title of the program that has been viewed. According to such a configuration, in the case of viewing a sports broadcast, comments on the match or the like is automatically retrieved and displayed.

It should be understood by those skilled in the art that various modifications, combinations, sub-combinations and alterations may occur depending on design requirements and other factors insofar as they are within the scope of the appended claims or the equivalents thereof.

For example, in the embodiment described above, the information processing apparatus is represented by a PC, but the present disclosure is not limited to such an example. For example, the information processing apparatus may be a device such as a game device for home use, a consumer electronics device, a mobile phone, a mobile information terminal, or a portable video processing device. The information processing apparatus may be any device as long as it mainly has a display section, or it is connected to a display device.

Further, in the embodiment described above, the apparatus which functions as the UNR server is represented by a television receiver, but the present disclosure is not limited to such an example. For example, the apparatus may be a device such as a video processing apparatus for home use. In the above, the description has been made on the method of performing, based on the UNR protocol, processing related to the device search, device registration, and connection between devices. However, if there is a method which can realize the device search, device registration, and connection between devices in the same manner as in the case of using the UNR protocol, the method can be applied and the technology according to the present embodiment can be modified. Also, communication means between devices is not limited to the communication means exemplified by FIG. 1. Such modification is also within the scope of the present embodiment.

Note that in the present specification, the steps written in the sequence diagram may of course be processed in chronological order in accordance with the stated order, but may not necessarily be processed in the chronological order, and may be processed individually or in a parallel manner. It is needless to say that, in the case where the steps are processed in the chronological order, the order of the steps may be changed appropriately according to circumstances.

The present disclosure contains subject matter related to that disclosed in Japanese Priority Patent Application JP 2011-011414 filed in the Japan Patent Office on Jan. 21, 2011, the entire content of which is hereby incorporated by reference.

What is claimed is:

1. An information processing apparatus comprising:
   an operation section performs remote control of a television receiver having a display screen;
   a content information acquisition section (a) retrieves first content information related to broadcast content currently output by the television receiver including at least channel and title information, (b) acquires second content information from the television receiver, the second content information includes a plurality of information related to the first content information, and (c) causes a storage section to store the first and second content information; and a display controller controls a display screen of the information processing apparatus to display information on the display screen of the information processing apparatus while the display screen of the television receiver displays the broadcast content, the display screen displaying (1) a first display area indicating location of the television receiver, (2) a second display area indicating a keyboard input area and (3) a third display area displaying the first content information in a first viewing area and displaying the second content information in a second viewing area, wherein the display controller controls the display screen of the information processing apparatus to display an availability information indicating (a) whether a second content, corresponding to the second content information, is purchasable based on an internet search while the broadcast content is currently broadcast and output by the television receiver and (b) location of internet purchase site.

2. The information processing apparatus according to claim 1, further comprising a search section searches for related information using as a keyword the first content information retrieved by the content information acquisition section, wherein the display controller controls display of the display screen including the related information in addition to the content information.

3. The information processing apparatus according to claim 2, wherein the search section searches for the related information from among information stored in an external apparatus which is connected through a network.

4. The information processing apparatus according to claim 2, wherein the operation section performs remote control of the television receiver based on the related information included in the display screen.

5. The information processing apparatus according to claim 3, wherein, even after the television receiver comes into a state of not providing content, the display controller updates the display screen including the related information based on the content information acquired by the content information acquisition section.

6. The information processing apparatus according to claim 4, wherein the operation section changes a channel received by the television receiver to a channel for providing content indicated by the related information.

7. The information processing apparatus according to claim 1, wherein the content information acquisition section acquires content information related to content being provided by the television receiver, and wherein, when the content provided by the television receiver is changed, the display control section updates contents of the display screen.

8. An information processing apparatus comprising:

an operation section performs remote control of a content reproduction apparatus having a display screen;

a content information acquisition section (a) retrieves first content information related to broadcast content currently reproduced by the content reproduction apparatus including at least channel and title information, (b) acquires second content information from the content reproduction apparatus, the second content information includes a plurality of information related to the first content information and (c) causes a storage section to store the first and second content information; and a display controller controls a display screen of the information processing apparatus to display information on the display screen of the information processing apparatus while the display screen of the content reproduction apparatus displays the broadcast content, the display screen displaying (1) a first display area indicating location of the television receiver, (2) a second display area indicating a keyboard input area and (3) a third display area displaying the first content information in a first viewing area and displaying the second content information in a second viewing area, wherein the display controller controls the display screen of the information processing apparatus to display an availability information indicating (a) whether a second content, corresponding to the second content information, is purchasable based on an internet search while the broadcast content is currently broadcast and displayed on the content reproduction apparatus and (b) location of internet purchase site.

9. An information processing method performed by an information processing apparatus including an operation section which performs remote control of a television receiver, the information processing method comprising:

retrieving first content information related to broadcast content currently output by a display screen of the television receiver including at least channel and title information;

acquiring second content information related to the retrieved first content information, the second content information includes a plurality of information related to the first content information;

causing a storage section to store the first and second content information; and controlling a display screen of the information processing apparatus to display information on the display screen of the information processing apparatus while the display screen of the television receiver displays the broadcast content, the display screen displaying (1) a first display area indicating location of the television receiver, (2) a second display area indicating a keyboard input area and (3) a third display area displaying the first content information in a first viewing area and displaying the second content information in a second viewing area, wherein the display screen of the information processing apparatus is controlled to display an availability information indicating (a) whether a second content, corresponding to the second content information, is purchasable based on an internet search while the broadcast content is currently broadcast and output by the television receiver and (b) location of internet purchase site.

10. A program embodied on a non-transitory computer readable medium for causing a computer to function as an information processing apparatus including an operation section performs remote control of a television receiver having a display screen, a content information acquisition section (a) retrieves first content information related to broadcast content currently output by the television receiver including at least channel and title information, (b) acquires second content information from the television receiver, the second content information includes a plurality of information related to the first content information, and (c) causes a storage section to store the first and second content information; and a display controller controls a display screen of the information processing apparatus to display information on the display screen of the information processing apparatus while the display screen of the television receiver displays the broadcast content, the display screen displaying (1) a first display area indicating location of the television receiver, (2) a second display area indicating a keyboard input area and (3) a third display area displaying the first content information in a first viewing area and displaying the second content information in a second viewing area, wherein the display controller controls the display screen of the information processing apparatus to display an availability information indicating (a) whether a second content, corresponding to the second content information, is purchasable based on an internet search while the broadcast content is currently broadcast and output by the television receiver and (b) location of internet purchase site.

11. The information processing apparatus according to claim 1, wherein the second content information is retrieved from both of a home network and an internet network.

12. The information processing apparatus according to claim 11, wherein a device, containing the recommended program of the second content information, is manually pre-registered in the home network.

13. The information processing apparatus according to claim 11, wherein an existence of content related to the second content information is notified in a device on the home network.

14. The information processing apparatus according to claim 1, wherein the second content information is linked to internet content.

15. The information processing apparatus according to claim 1, wherein a user can bookmark the second content information.

16. The information processing apparatus according to claim 1, wherein the display controller controls display of the display screen of the information processing apparatus to display history information of an Internet application accessed from the television receiver in addition to display of the first and second content information.

17. The information processing apparatus according to claim 1, wherein an Internet browser is displayed on the display screen of the information processing apparatus in addition to the first and second content information.

18. An information processing method performed by an information processing apparatus including an operation section which performs remote control of a content reproduction apparatus, the information processing method comprising:

retrieving first content information related to broadcast content currently output by a display screen of the content reproduction apparatus including at least channel and title information;

acquiring second content information related to the retrieved first content information, the second content information includes a plurality of information related to the first content information;

causing a storage section to store the first and second content information; and controlling a display screen of the information processing apparatus to display information on the display screen of the information processing apparatus while the display screen of the content reproduction apparatus displays the broadcast content, the display screen displaying (1) a first display area indicating location of the television receiver, (2) a second display area indicating a keyboard input area and (3) a third display area displaying the first content information in a first viewing area and displaying the second content information in a second viewing area, wherein the display screen of the information processing apparatus is controlled to display an availability information indicating whether (a) a second content, corresponding to the second content information, is purchasable based on an internet search while the broadcast content is currently broadcast and displayed on the content reproduction apparatus and (b) location of internet purchase site.

19. The information processing apparatus according to claim 1, wherein third content information is acquired and simultaneously displayed with the first and second content information, the third content information contains history information of content provided from the television receiver.

20. The information processing apparatus according to claim 1, further comprising a browser, wherein a character string of the first or second content information is copyable for searching by the browser and wherein the plurality of contents of the second content information are music content information.

21. The information processing apparatus according to claim 8, wherein third content information is acquired and simultaneously displayed with the first and second content information, the third content information contains history information of content provided from the television receiver.

22. The information processing apparatus according to claim 8, further comprising a browser, wherein a character string of the first or second content information is copyable for searching by the browser and wherein the plurality of contents of the second content information are music content information.

23. The information processing method according to claim 9, wherein third content information is acquired and simultaneously displayed with the first and second content information, the third content information contains history information of content provided from the television receiver.

24. The information processing method according to claim 9, further comprising a browser, wherein a character string of the first or second content information is copyable for searching by the browser and wherein the plurality of contents of the second content information are music content information.

25. The program according to claim 10, wherein third content information is acquired and simultaneously displayed with the first and second content information, the third content information contains history information of content provided from the television receiver.

26. The program according to claim 10, further comprising a browser, wherein a character string of the first or second content information is copyable for searching by the browser and wherein the plurality of contents of the second content information are music content information.

27. The information processing method according to claim 18, wherein third content information is acquired and simultaneously displayed with the first and second content information, the third content information contains history information of content provided from the television receiver.

28. The information processing method according to claim 18, further comprising a browser, wherein a character string of the first or second content information is copyable for searching by the browser and wherein the plurality of contents of the second content information are music content information.

* * * * *